Figure 1:
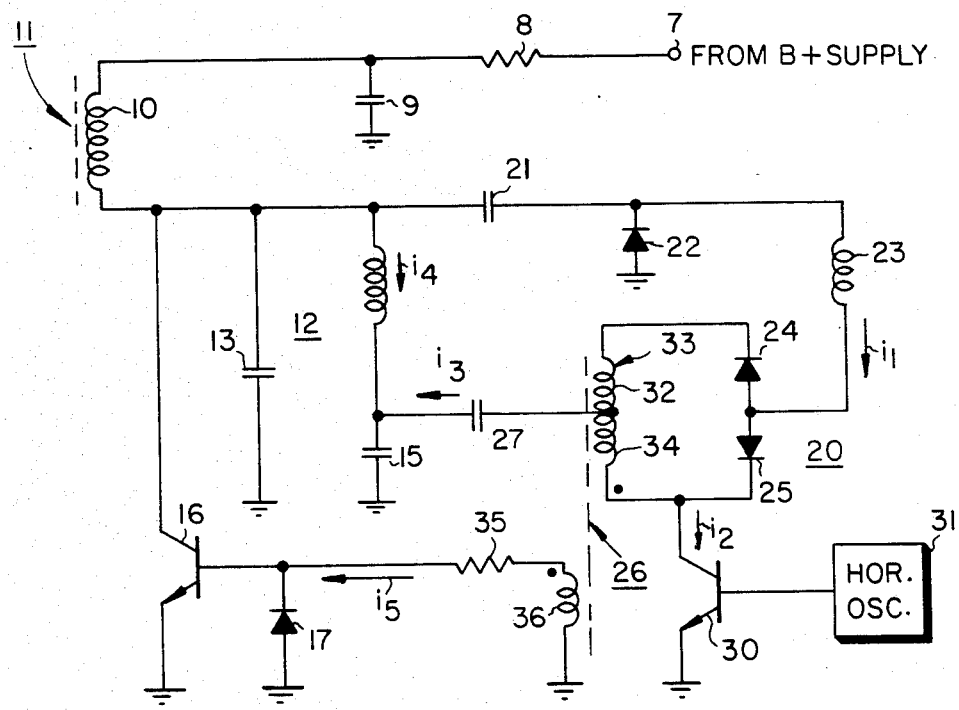

United States Patent [19]

Haferl

[11] Patent Number: 4,468,593

[45] Date of Patent: Aug. 28, 1984

[54] HORIZONTAL DRIVE AND NONLINEARITY CORRECTION CIRCUIT

[75] Inventor: Peter E. Haferl, Adliswil, Switzerland

[73] Assignee: RCA Corporation, New York, N.Y.

[21] Appl. No.: 458,585

[22] Filed: Jan. 17, 1983

[30] Foreign Application Priority Data

Apr. 23, 1982 [GB] United Kingdom ............... 8211830

[51] Int. Cl.³ ........................................... H01J 29/56
[52] U.S. Cl. ................................... 315/371; 315/408
[58] Field of Search ................ 315/408, 399, 370, 371

[56] References Cited

U.S. PATENT DOCUMENTS

| | | | |
|---|---|---|---|
| 3,751,707 | 8/1973 | Greiner et al. | 315/27 |
| 3,796,911 | 3/1974 | Ensor et al. | 315/27 |
| 4,281,275 | 7/1981 | Chapman et al. | 315/399 |
| 4,338,550 | 7/1982 | Marino | 315/408 |

Primary Examiner—Theodore M. Blum
Attorney, Agent, or Firm—Paul J. Rasmussen; Peter M. Emanuel; Scott J. Stevens

[57] ABSTRACT

A horizontal deflection nonlinearity correction circuit utilizes horizontal retrace pulse energy to provide nonlinearity correction of the horizontal deflection current. An inductor stores retrace pulse energy during the horizontal retrace interval and releases the energy during the horizontal trace interval. Nonlinearity correction is accomplished by appropriate charging and discharging of the horizontal deflection circuit S-shaping capacitor. The nonlinearity correction circuit may be combined with horizontal driver circuitry to provide economy of circuit components.

9 Claims, 2 Drawing Figures

HORIZONTAL DRIVE AND NONLINEARITY CORRECTION CIRCUIT

This invention relates to the correction of nonlinearity errors of television receiver horizontal deflection circuits, and in particular, to the correction of asymmetrical errors which occur due to energy losses in the deflection circuit.

Deflection or scanning of the electron beam or beams in a television picture tube is provided by a deflection yoke mounted on the neck of the tube and comprising vertical and horizontal deflection coils. The deflection currents in the coils are controlled to produce appropriate deflection fields in order to properly deflect the electron beams.

During the trace interval of the horizontal deflection cycle, the main operating components of the horizontal deflection circuit are the horizontal deflection coils of the deflection yoke and the S-shaping capacitor, which corrects symmetrical scan nonlinearity distortion caused by the picture tube geometry. The amount of deflection energy necessary to scan a given horizontal line is applied to the horizontal deflection coils at the beginning of each horizontal trace interval. This energy circulates in a resonant manner during horizontal trace from the yoke into the S-shaping capacitor and back into the yoke. Energy losses in the circuit, if not compensated, cause the circulating energy to decrease during the horizontal trace interval, resulting in a smaller deflection current amplitude at the end of trace than at the beginning of trace. This appears as a compressed picture at one side of the screen. This asymmetrical horizontal nonlinearity error is caused by the sum of the energy losses in the horizontal deflection circuit, most of which occur as resistance losses in the horizontal coils of the deflection yoke.

U.S. patent application Ser. No. 363,516, filed Mar. 30, 1982, in the name of P. E. Haferl, assigned to the same assignee as the present application, and entitled "Linearity Corrected Horizontal Deflection Circuit", illustrates a correction of this asymmetrical nonlinearity distortion by adding and removing energy to the horizontal deflection circuit from a dc power source via the horizontal S-shaping capacitor. The combination of horizontal driver circuitry with components that provide horizontal nonlinearity correction, such as is described in the abovedescribed U.S. patent application, is desirable in that common circuit components may be utilized, thereby reducing costs. Interaction between combined circuits such as nonlinearity correction and side pincushion distortion correction may result in a deterioration in the quality of nonlinearity correction due to changes in deflection current amplitude caused by the side pincushion correction. Such interactions are desirably avoided. The present invention concerns a horizontal nonlinearity correction circuit combined with a horizontal driver that provides desired nonlinearity correction independent of alteration in the horizontal deflection current. The nonlinearity correction circuit also derives its power from the horizontal retrace energy so that direct connection to a dc power source is not required.

In accordance with the present invention, a horizontal deflection circuit comprises a horizontal output circuit which provides a source of scanning current including horizontal retrace pulses and includes a horizontal output transistor and a deflection winding.

A horizontal driver transistor is responsive to switching signals for providing first and second intervals, respectively, with the first interval encompassing the horizontal retrace interval.

A nonlinearity correction circuit comprises an inductor coupled to the source of scanning current. A first transformer winding is coupled to the inductor and to the horizontal output circuit. A second transformer winding is coupled to the inductor, to the output circuit, and to the driver transistor such that the inductor stores energy during the first driver transistor interval and releases energy to the output circuit during the second driver transistor interval to provide nonlinearity correction.

A third transformer winding is coupled to the horizontal output transistor to control the transistor in response to current flow in the first and second windings.

Figure 2:
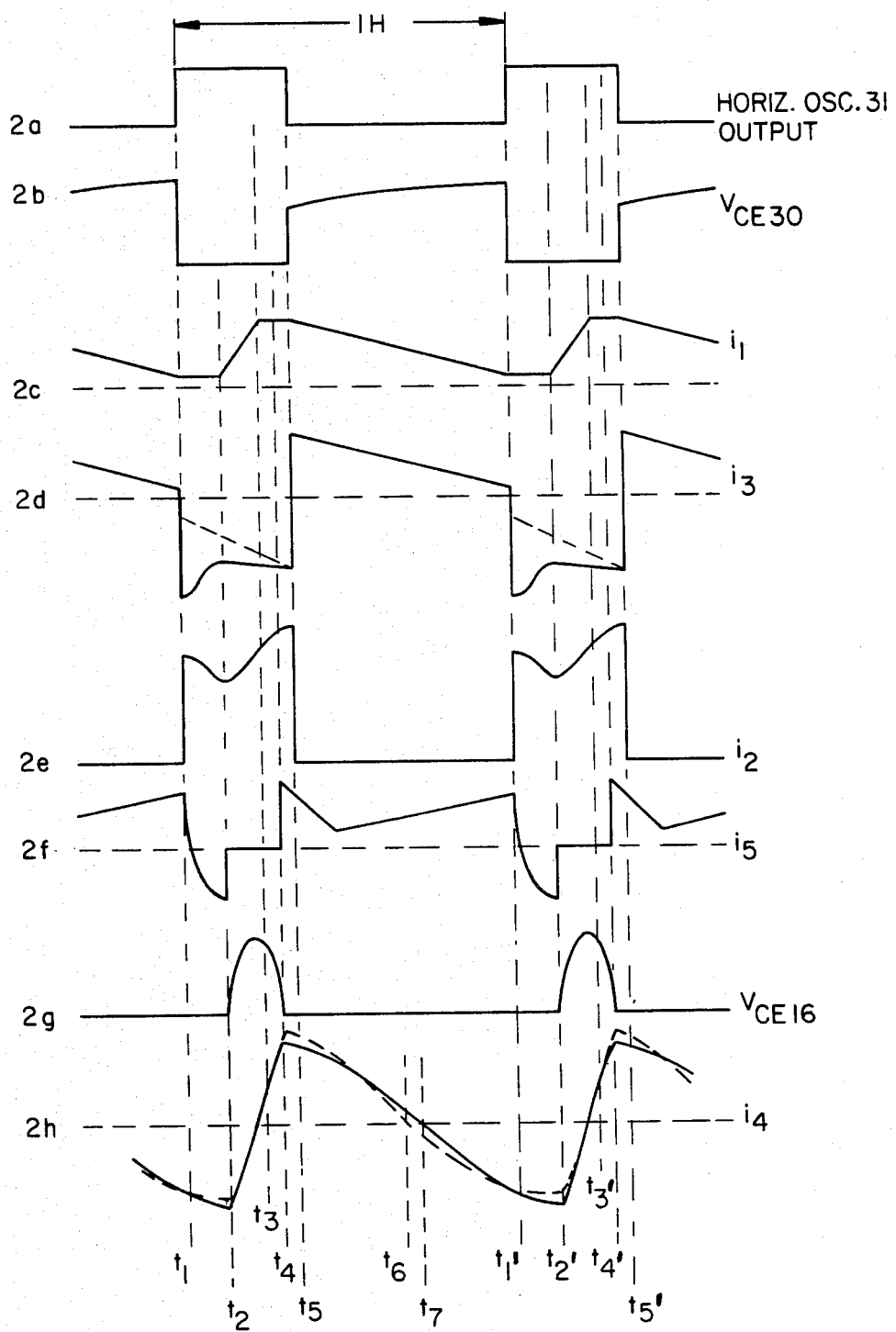

In the accompanying drawing,

FIG. 1 illustrates a schematic diagram of a horizontal deflection circuit incorporating a nonlinearity correction circuit constructed in accordance with the present invention; and FIG. 2 illustrates waveforms associated with the circuit of FIG. 1.

Referring to FIG. 1, there is illustrated a horizontal deflection circuit for use in a television receiver. Power for operating the deflection circuit is provided from a regulated source of B+ voltage, of the order of 130 volts dc, which is applied to a terminal 7. Current from the B+ voltage supply flows through a current limiting resistor 8 to a storage capacitor 9 and through a primary winding 10 of a flyback transformer 11, to a horizontal output circuit 12. Flyback transformer 11 may comprise a plurality of secondary windings (not shown) which provide power to other receiver circuits, such as the kinescope driver and high voltage circuits (not shown) and the vertical deflection circuit (also not shown).

The horizontal output circuit 12 comprises a retrace capacitor 13, a horizontal deflection yoke winding 14, an S-shaping capacitor 15 and a horizontal output transistor 16. A damper diode 17 is shown coupled between the base of output transistor 16 and ground. The breakdown voltage requirement of damper diode 17 is less in this arrangement than it would be with the damper diode connected across the collector-emitter path of output transistor 16.

In accordance with the invention, the horizontal deflection circuit includes a horizontal drive and nonlinearity correction circuit 20 which in the embodiment shown comprises a coupling capacitor 21, a clamp diode 22, an energy storage inductor 23, diodes 24 and 25, a driver transformer 26, a coupling capacitor 27, a driver transistor 30, and a horizontal oscillator 31.

The operation of the horizontal deflection circuit will now be described. The output of horizontal oscillator 31, shown by the waveform of FIG. 2a, is a switching signal that controls the conduction of driver transistor 30. At a time prior to $t_1$, before the positive-going pulse of the switching signal from oscillator 31, driver transistor 30 is nonconductive, as shown by waveform 2b, which illustrates the collector-emitter voltage ($V_{CE30}$) of driver transistor 30. During that time, a current $i_1$, shown by the waveform in FIG. 2c, flows from ground through diode 22, inductor 23, diode 24, an upper winding portion 32 of a winding 33 of transformer 26 and capacitor 27 into horizontal output circuit 12. As the current $i_1$ decreases, an increasing current $i_5$, shown in FIG. 2f, is developed in winding 36 of transformer 26 by transformer action. This current i₅ flows through a resistor 35 into the base of transistor 16 maintaining transistor 16 in saturation. At time t₁, driver transistor 30 is rendered conductive and driven into saturation in response to the positive-going pulse of the switching signal (FIG. 2a) of the horizontal oscillator 31. The current i₁ then flows from ground through diode 22, inductor 23, diode 25 and transistor 30 to ground.

During the initial portion of the conduction interval of transistor 30, from t₁ to t₂, both ends of inductor 23 are grounded, so that the current i₁, which flows through conductive diodes 22 and 25 and conductive transistor 30, remains substantially constant, as shown by the waveform in FIG. 2c; therefore, the amount of energy stored in inductor 23 does not change. Capacitor 27 begins to discharge through a lower winding portion 34 of winding 33 and transistor 30 to ground. The current i₂ through transistor 30, shown in FIG. 2e, is the sum of the current i₁ through inductor 23 and the discharge current i₃ of capacitor 27. The current i₃ through winding portion 34 generates a negative voltage across winding 36 of transformer 26, causing the current i₅ to become negative, as shown in FIG. 2f. This current flows as negative base current of transistor 16 until time t₂, when transistor 16 becomes cut off, thereby initiating the horizontal retrace interval.

At time t₂ with transistor 16 cut off, the horizontal retrace voltage, shown in FIG. 2g, begins to increase. This horizontal retrace voltage is also applied via the coupling capacitor 21 to diode 22 and inductor 23. The horizontal retrace voltage reverse biases diode 22 and, as a result, the current i₁ through inductor 23 increases, thereby storing energy in inductor 23, until a time t₃ which depends upon the value of capacitor 21 and inductor 23. The decreasing horizontal retrace voltage during the second half of the horizontal retrace interval causes the voltage across capacitor 21 to be clamped to ground at time t₃ by diode 22 prior to the end of the horizontal retrace interval. When this occurs, capacitor 21 discharges into the horizontal deflection winding 14. As diode 22 begins to conduct, thereby clamping the voltage across capacitor 21 to ground, the current i₁ stops increasing. Both ends of inductor 23 are again grounded; therefore, the current i₁ and the amount of energy stored in inductor 23 remain substantially constant, as can be seen in FIG. 2c. The horizontal retrace interval terminates at time t₄ when the horizontal retrace voltage reaches zero and is clamped by transistor 16 and damper diode 17.

The drive transistor 30 is cut off at a time t₅ by switching of the output of horizontal oscillator 31, as can be seen in FIG. 2a. The current i₁ again flows from ground through diode 22, inductor 23, diode 24, the upper winding portion 32 of transistor winding 33 and capacitor 27 into the horizontal output circuit 12. After time t₅, the current i₁ generates a positive current i₅ via transformer action into the base of transistor 16 to maintain it in saturation as shown in FIG. 2f. At time t₁', transistor 30 is again driven into saturation by the output from horizontal oscillator 31 and the above-described cycle starts again.

As previously described, the nonlinearity error caused by the deflection circuit losses results in unequal deflection current amplitudes at times t₂ and t₄, the end and beginning of the horizontal trace interval, respectively, and causes the zero crossing of the deflection current (i₄) to occur too early, i.e., at time t₆ instead of time t₇, as can be seen by the uncorrected dashed waveform of FIG. 2h. In order to correct this problem, the current i₃ adds some energy to the horizontal deflection circuit during the interval at time t₅-t₁', as previously described, causing the deflection current amplitude to increase toward the end of horizontal trace, as can be seen by the corrected solid waveform of FIG. 2h. During the horizontal retrace interval, times t₂-t₄, transistor 16 is cut off and capacitor 13, horizontal deflection winding 14 and the primary winding 10 of transformer 11 form a resonant retrace circuit, thereby generating the horizontal retrace pulses.

The accumulated energy losses of one horizontal scan line are replenished during the horizontal retrace interval by the energy stored in primary winding 10 of transformer 11. Energy from winding 10 is added until the average horizontal retrace voltage equals the dc voltage across capacitor 9. The increased deflection current near the end of horizontal trace (time t₂') provided by the nonlinearity correction current i₃ causes less energy to pass from winding 10 into the capacitor 13 during the horizontal retrace interval, resulting in a decreased deflection current i₄ near the beginning of horizontal trace (time t₄), as shown by the solid waveform in FIG. 2h. The negative portion of the current i₃, which in fact takes energy out of the deflection circuit during the conduction interval of transistor 30 (time t₁ to time t₅, has a negligible effect on the operation of the deflection circuit because it occurs around and during the horizontal retrace interval, so that its influence is balanced by the energy supplied or transferred from winding 10 of transformer 11. The current i₃ changes its direction rapidly at time t₅ and transfers energy again into the horizontal output circuit 12. The higher amplitude of the correction current i₃ prior to the middle of the horizontal trace interval charges S-shaping capacitor 15 faster during the first half of the horizontal trace interval, as compared to the second half of the horizontal trace interval, resulting in a slower decrease of the deflection current during the first half of horizontal trace. This causes more S-shaping at the beginning of horizontal trace and a shift of the deflection current (i₄) zero crossing from time t₆ to time t₇, which is the actual middle of the horizontal trace interval. The added charge in capacitor 15 by the current i₃ produces a desired greater increase of the deflection current and less S-shaping during the second half of the horizontal trace interval, as illustrated by the solid waveform in FIG. 2h.

During the interval time t₅ to time t₁', when transistor 30 is nonconductive, the nonlinearity correction current i₃ is equal to the current i₁, which is proportional to the retrace pulse voltage amplitude versus time characteristic, illustrated in FIG. 2g as the collector-emitter voltage of transistor 16. Therefore, any change in horizontal retrace pulse width or peak amplitude (and hence a change in peak deflection current) will result in a proportional change in nonlinearity correction, so that the amount of nonlinearity correction is closely correlated to the peak deflection circuit. Furthermore, a load change on any of the windings of transformer 26, such as a base-emitter voltage variation of transistor 16, which may occur when the transistor heats up, has substantially no influence on the current i₃ because inductor 23 acts as a current source and the amplitude of the current i₁ through inductor 23 is determined only by the retrace pulse voltage amplitude characteristic. The current i₁ is actually the discharge current of inductor 23; therefore, the voltages applied to transistor 30 are relatively low, resulting in low power consumption and voltage stress with respect to transistor 30. The parabola shaped voltage across the S-shaping capacitor 15 has little influence on the operation of the nonlinearity correction circuit because of the current source characteristic of inductor 23. The effect of duty cycle variations of the horizontal oscillator 31 (occurring because of storage time variations of transistor 16) is negligible because the current $i_1$ is determined by the retrace pulse voltage amplitude characteristic and not by the conduction time of transistor 30. The adjustment of the correct amount of nonlinearity correction is accomplished by selection of the value of capacitor 21. A higher value of capacitor 21 results in a higher peak current $i_1$ and in a greater amount of nonlinearity correction. Inductor 23 provides a means for storing and releasing energy from the horizontal retrace pulses in order to provide power to the nonlinearity correction circuit. The energy of the horizontal retrace pulses is therefore used to provide linearity correction, and a separate power supply or separate connection to the B+ supply is not required, resulting in lower receiver power consumption.

The influence of the transistor 16 base current $i_5$ on the nonlinearity correction current $i_3$ during the interval time $t_1$ to time $t_5$ is shown in FIG. 2d. The dashed line of the waveform in FIG. 2d indicates the current $i_3$ without the influence of $i_5$. The effect of the current $i_5$ does not produce any visible deflection velocity errors because the impedance of the winding 33 of transformer 26 is much higher than the impedance of the horizontal output circuit 12.

Capacitor 27 has three functions: dc isolation between the horizontal driver and nonlinearity correction circuit 20 and the horizontal output circuit 12, so that no dc component is added to the horizontal output circuit 12; a storage capacitor for the operating voltage of the nonlinearity correction circuit; and shaping of the transistor 16 base current $i_5$. A smaller value of capacitor 27 results in a faster increase in the current $i_5$ close to time $t_1'$. An increasing base current $i_5$ is necessary for an optimized turnoff condition of transistor 16.

Representative component values for the circuit of FIG. 1 are as follows:

| | |
|---|---|
| Resistor 8 | 15 ohms |
| Capacitor 9 | 0.47 uF |
| Winding 10 | ≃6 mH |
| Capacitor 13 | 7500 pf |
| Horizontal deflection winding | 1.9 mH |
| Capacitor 15 | 0.47 uF |
| Capacitor 21 | 2200 pf |
| Inductor 23 | 30 mH |
| Winding 33 | 800 turns, center tapped, 160 mH total |
| Winding 36 | 30 turns |
| Capacitor 27 | 0.1 uF |
| Resistor 35 | 0.56 ohms |

What is claimed is:

1. A horizontal deflection current nonlinearity correction circuit comprising:
   a horizontal deflection winding;
   a horizontal output circuit incorporating a source of horizontal retrace pulses for providing horizontal deflection current to said deflection winding;
   an inductance coupled to said horizontal deflection winding and said horizontal output circuit; and
   switch means responsive to horizontal rate switching signals for defining first and second intervals, said switch means causing said retrace pulses to be applied to said inductance for storing energy in said inductance during one of said first and second intervals and causing said stored energy to be applied to said deflection winding during the other of said first and second intervals for providing nonlinearity correction to said deflection current.

2. The arrangement defined in claim 1 wherein the amount of energy stored in said inductance by said retrace pulses is proportional to the amplitude of said retrace pulses and wherein nonlinearity correction of said deflection current is provided by the coupling of said inductance to said deflection winding by operation of said switch means.

3. In a horizontal deflection circuit comprising a horizontal output circuit including a horizontal output transistor for providing a scanning current to a deflection winding, and providing a source of horizontal deflection energy including horizontal retrace pulses defining horizontal trace and retrace intervals, said horizontal deflection circuit incorporating a horizontal driver switch responsive to a switching signal for providing first and second intervals, an asymmetrical nonlinearity correction circuit comprising:
   an inductance coupled to said source of horizontal deflection energy;
   a first transformer winding coupled to said inductance and said horizontal output circuit;
   a second transformer winding coupled to said inductance and to said horizontal output circuit and to said driver switch, such that said inductance stores energy from said horizontal retrace pulses during one of said driver switch first and second intervals and releases said stored energy during the other of said first and second intervals to said horizontal output circuit to provide nonlinearity correction to said scanning current; and
   a third transformer winding coupled to said horizontal output transistor for controlling switching of said output transistor in response to current flow in said first and second transformer windings.

4. The arrangement defined in claim 3, wherein said horizontal driver switch comprises a transistor which is conductive during said first interval and nonconductive during said second interval.

5. The arrangement defined in claim 4, wherein said inductance stores energy during said first switch interval and releases energy during said second switch interval.

6. The arrangement defined in claim 3, further comprising a capacitor coupled to said source of horizontal deflection energy and to said inductance for applying said retrace pulse energy to said inductance.

7. The arrangement defined in claim 3, further comprising a capacitor coupled to said horizontal output circuit and to said first and second transformer windings for applying said stored energy to said horizontal output circuit.

8. The arrangement defined in claim 3, further comprising a diode coupled to a point of reference potential and to said inductance for providing a path for current flow through said inductance during said second switch interval.

9. The arrangement defined in claim 3, further comprising first and second diodes coupled to said inductance and to said first transformer winding and said horizontal driver switch respectively for providing a path for current flow through said inductance during said second and first switch intervals respectively.

* * * * *

UNITED STATES PATENT AND TRADEMARK OFFICE
CERTIFICATE OF CORRECTION

PATENT NO. : 4,468,593
DATED : August 28, 1984
INVENTOR(S) : Peter Eduard Haferl It is certified that error appears in the above—identified patent and that said Letters Patent is hereby corrected as shown below:

Column 4, line 59 that portion reading "circuit" should read -- current --.

Signed and Sealed this

Twenty-eighth Day of May 1985

[SEAL]

Attest:

DONALD J. QUIGG

Attesting Officer    Acting Commissioner of Patents and Trademarks